United States Patent [19]
Borodin et al.

[11] 3,993,332
[45] Nov. 23, 1976

[54] PIPE JOINT

[75] Inventors: Daniel J. Borodin, Detroit; Wilbur E. Tolliver, Holland, both of Mich.

[73] Assignee: New York Wire Mills Corporation, Tonawanda, N.Y.

[22] Filed: Jan. 20, 1975

[21] Appl. No.: 542,379

[52] U.S. Cl. ................................ 285/94; 285/166; 285/336; 285/369; 285/370
[51] Int. Cl.$^2$ ........................................ F16L 27/06
[58] Field of Search ............... 285/332.1, 167, 166, 285/168, 261, 230, 231, 334.2, DIG. 10, DIG. 20, 55, 369, 223, 94, 336, 369, 370

[56] References Cited
UNITED STATES PATENTS

| | | | |
|---|---|---|---|
| 1,040,191 | 10/1912 | Hale | 285/166 |
| 1,292,992 | 2/1919 | Bartram | 285/332.1 X |
| 1,561,033 | 11/1925 | Spencer | 285/167 |
| 2,417,025 | 3/1947 | Volpin | 285/336 X |
| 2,907,590 | 10/1959 | Oswald | 285/DIG. 10 |
| 3,502,356 | 3/1970 | Schmunk | 285/230 |

FOREIGN PATENTS OR APPLICATIONS

| | | | |
|---|---|---|---|
| 998,646 | 9/1951 | France | 285/261 |
| 1,005,319 | 3/1957 | Germany | 285/166 |
| 931,206 | 8/1955 | Germany | 285/261 |
| 361,545 | 11/1931 | United Kingdom | 285/261 |

*Primary Examiner*—Thomas F. Callaghan
*Attorney, Agent, or Firm*—Price, Heneveld, Huizenga & Cooper

[57] ABSTRACT

The specification discloses a pipe joint which utilizes a spherically tapered coupling that mates spherically tapered pipe ends. Because of the spherical tapers, O-ring seals contained in the coupler do not engage the pipe ends until the pipe ends and coupling are seated to form the pipe joint. In one embodiment, a plastic ring or cap is made integral with each pipe end and acts as a sliding surface that allows ready joining of the pipe ends with the coupler.

11 Claims, 13 Drawing Figures

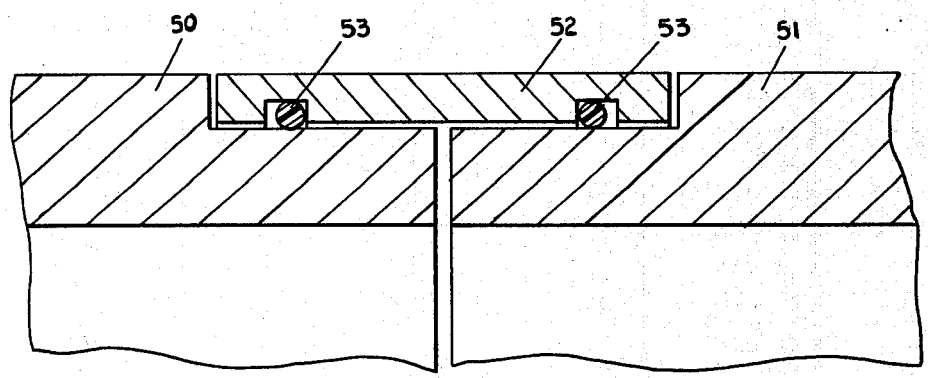
FIG. 8 "PRIOR ART"
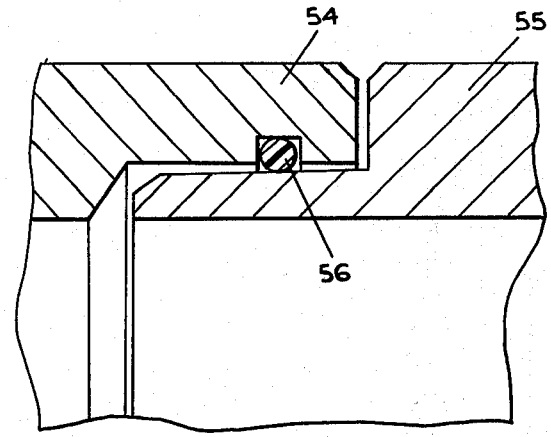
FIG. 9 "PRIOR ART"
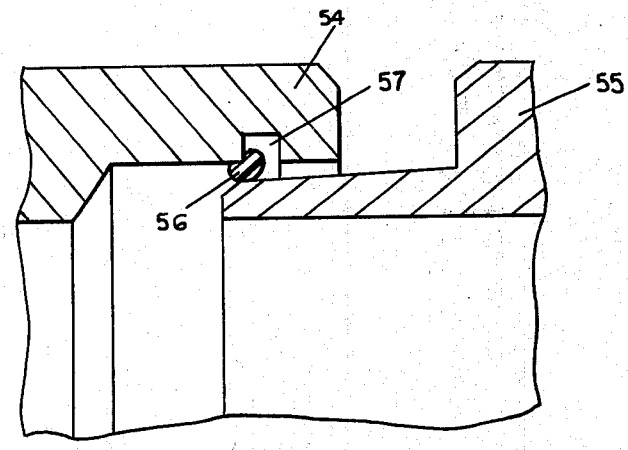
FIG. 10 "PRIOR ART"

PIPE JOINT

BACKGROUND OF THE INVENTION

The present invention relates to pipe couplings. Numerous coupling systems have been developed which have sought to allow shifting or moving of joining pipe sections with respect to one another. One group of pipe joints utilizes pipe ends having mating spherical surfaces for permitting slight misalignment of the pipe section along the joint. This arrangement can be characterized as a ball-and-socket pipe connection. These ball-and-socket type connections use both internal and external seals. Generally, these connections require separate external clamps or collars to join together the pipe sections and thus are not well suited for joining sewer or other large pipe sections.

The most prevalently used pipe joint for sewer conduit or other large concrete pipe is the insertion of the male end of one pipe into a receiving female or bell end in the other pipe. Another type are those which are formed by joining male or female ends of pipe sections with a coupler. As seen in FIGS. 8–10, such joints may be formed without requiring clamps. As seen, particularly in FIG. 10, the seals used in forming the joint are sometimes caught and unseated by the ends of the pipe sections when the joint is formed. The seals in such pipe serve a support function as well as a sealing function. Also, the pipe joint, thus formed, allows only slight movement of the pipe ends and coupler with respect to each other.

SUMMARY OF THE INVENTION

The pipe joint of this invention may be easily formed without the use of clamps and without unseating of seals by the ends of the pipe sections. Further, the pipe joint allows movement and misalignment of adjacent pipe sections without disrupting the seal formed thereby. Finally, bell ends can be eliminated rendering manufacturing more economical.

The pipe joint comprises a spherically tapered coupling surface on a coupler that mates spherically tapered pipe ends. A longitudinal cross section, i.e., taken along the longitudinal axis of the pipe, of the pipe end portion shows that the taper of the pipe is continued upwardly from a point nearer the pipe center at the end of the pipe to a point farther from the pipe center spaced away from the end. Correspondingly, a vertical cross section of the coupler shows that the taper of the coupler continues from points at both ends of the coupler farther from the coupler center to a point nearer the center of the coupler. The mating spherical tapers lock the pipe together much like a self locking tapered joint and eliminates the necessity of the O-ring serving a support function. Typical O-rings or other annular seals are incorporated into the joint between the coupling and pipe surfaces along channels in the coupling. Preferably, if O-rings or the like are employed, the ring is seated in an annular channel extending along either the pipe ends or the coupler.

In one embodiment, the pipe ends are capped with plastic or other readily slidable material to ease the slidable engagement of the pipe ends with the coupler.

DESCRIPTION OF THE DRAWINGS

FIG. 8 is a partial longitudinal cross section view of a prior art pipe joint with a coupler;

FIG. 9 is a partial longitudinal cross section view of a prior art pipe joint without a coupler;

FIG. 10 is the pipe joint of FIG. 9 as it is being formed showing entanglement of the seal with the pipe end;

DESCRIPTION OF THE PREFERRED EMBODIMENT

Figure 1:
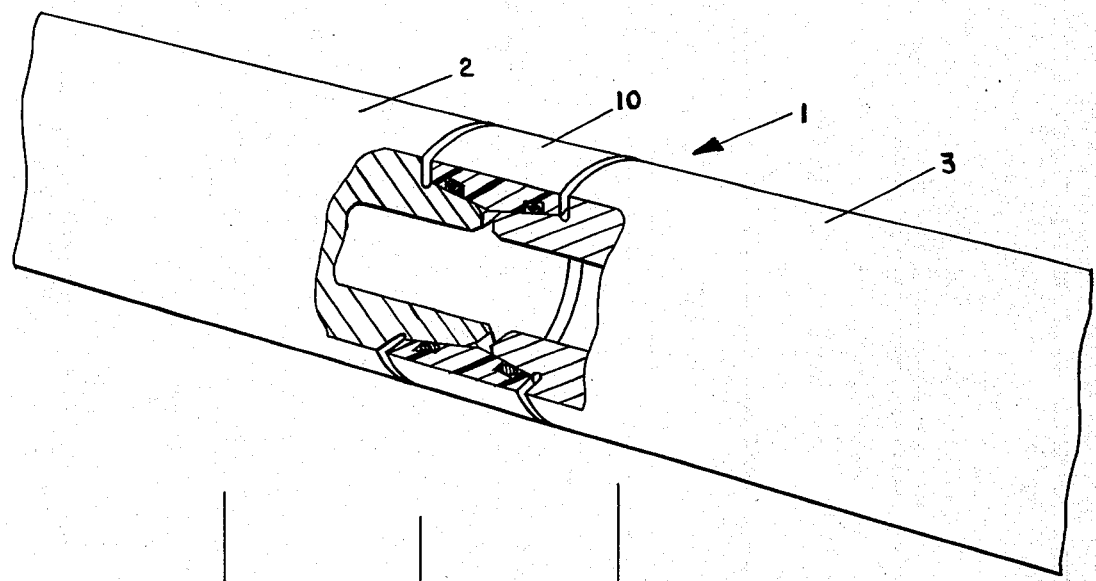
FIG. 1 is a break-away perspective view of the pipe joint.
Figure 2:
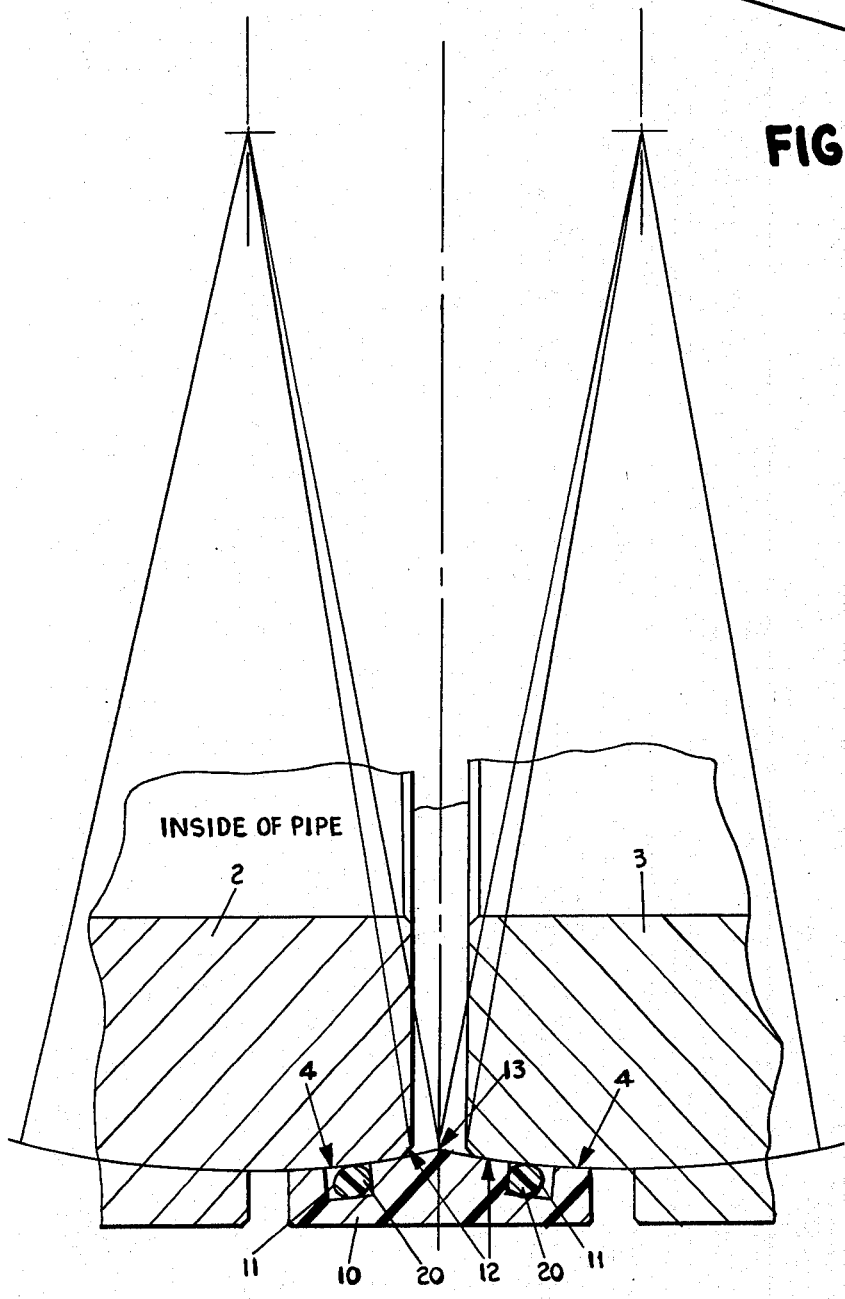
FIG. 2 is a partial longitudinal cross section view of the pipe joint.
Figure 3:
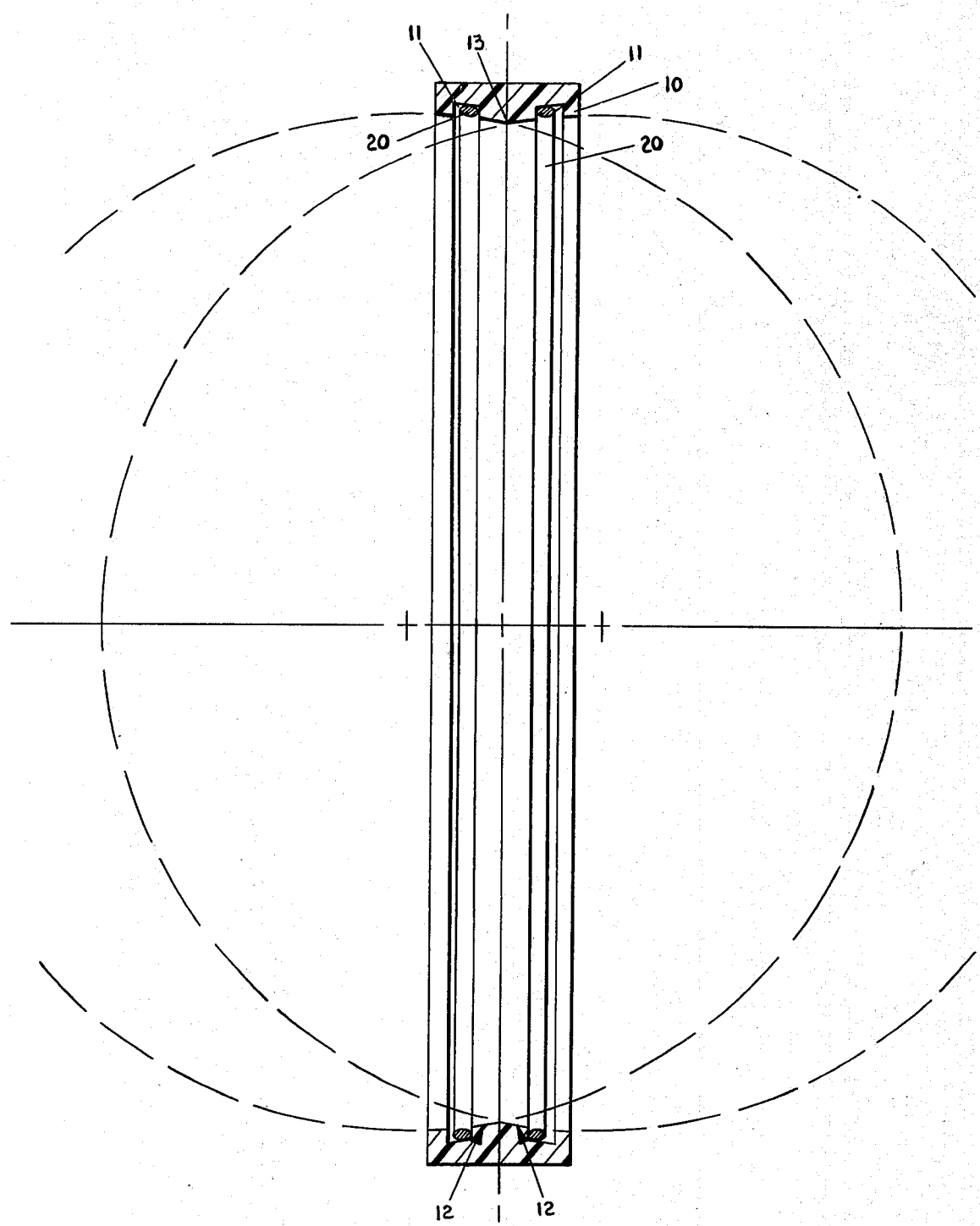
FIG. 3 is a longitudinal cross section view of the coupler and the O-rings contained therein.

Referring to the drawings, pipe joint 1 is formed by slidably joining pipe sections 2 and 3 into coupler 10 in the position shown in FIG. 1. Pipe sections 2 and 3 comprise at their respective ends convex, outwardly facing spherically tapered surfaces 4. As seen in cross section in FIG. 2, the taper at the protruding ends of pipes 2 and 3 continues upwardly from a point nearer the pipe center at the end of the respective pipe section to a point spaced away from the end and farther from the pipe center, as shown by the arcs in FIG. 2. Coupler 10 also shown in FIG. 2 is made of a relatively rigid material such as P.V.C. or ABS plastics or other comparable rigid or reinforced semi-rigid materials and comprises corresponding spherical tapered surfaces 12 which mate the spherical taper surfaces 4 of pipe sections 2 and 3. The corresponding spherical tapered surfaces 12 join at an apex 13 which is the inwardmost point of coupler 10. Channels 11 run annularly along the coupler 10 and act to house annular seals 20 (FIG. 3). If desired, channels 11 could extend along the ends of pipe sections 2 and 3 and seals 20 could be contained therein.

Figure 4:
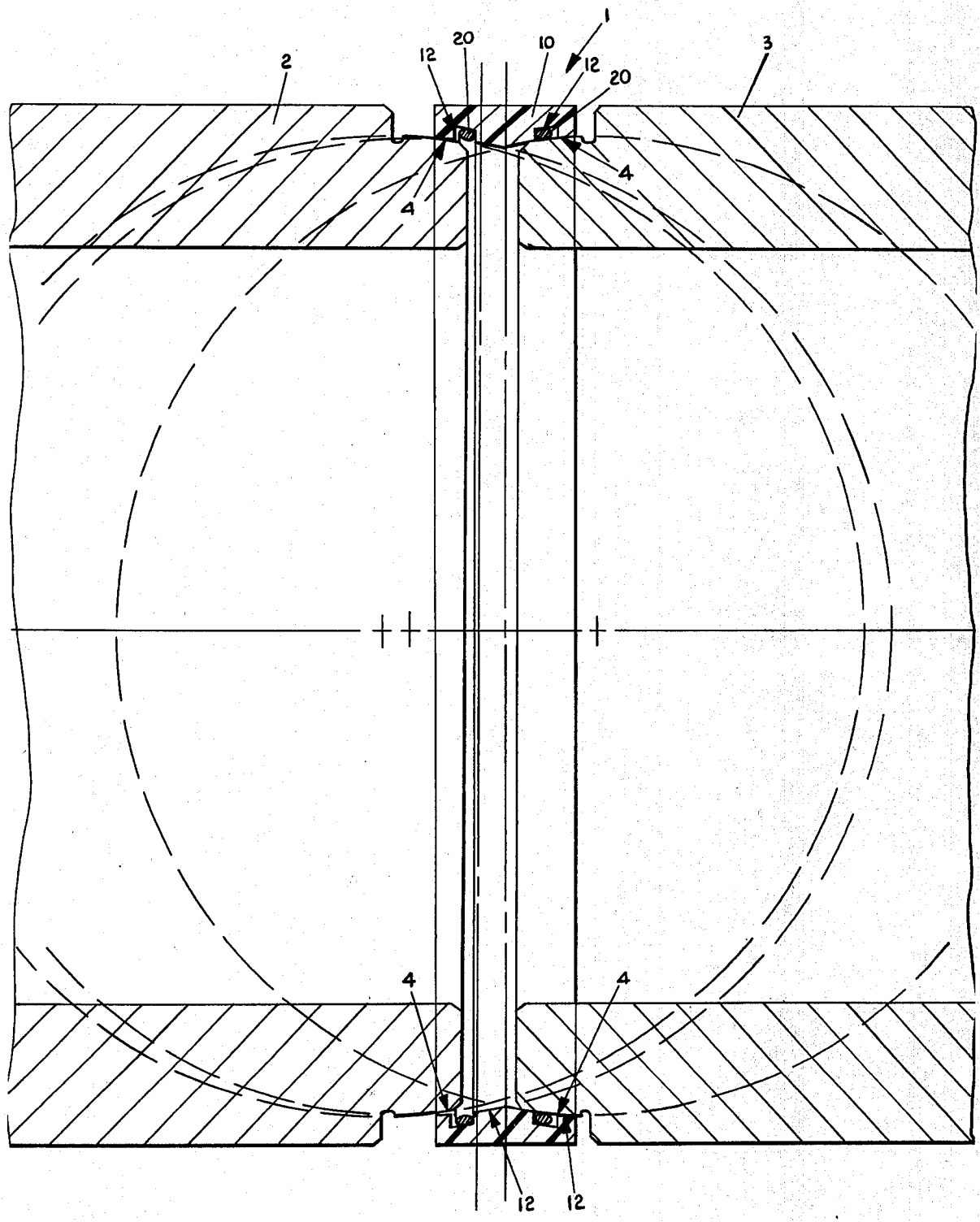
FIG. 4 is a longitudinal cross section view of the coupler with one pipe section in the process of being adjoined thereto and with the other pipe section already adjoined thereto.

As seen in FIG. 3, the spherical taper surfaces 12 which extend annularly around the coupler 10 define arcs which intersect at apex 13 of coupler 10. As seen in FIG. 4, the spherically tapered surfaces 4 at the ends of pipe sections 2 and 3 form similar concentric arcs.

It is important most that the outwardly facing spherically tapered surfaces 4 at the ends of pipe sections 2 and 3 taper convexly as viewed in longitudinal cross section from a low point, i.e., a point spaced more closely to the center line of the pipe, at the end of the pipe to a high point, i.e., a point spaced farther from the center line of the pipe, at a point spaced away from the end of the pipe along the length thereof. Conversely, it is important that the inwardly facing surfaces of the coupling 10 taper concavely from a low point near the center of the coupler, i.e., generally adjacent the ends of the pipe sections, to high points at the opposite ends of the coupler. This is important since it allows the pipe sections to be joined to coupling 10 without requiring any special clamps. If, for example, each outwardly facing spherically tapered surface 4 tapered from a low point at the end of the pipe, to a high point spaced from the end of the pipe and through the high point to still another lower point, and if the spherically tapered surfaces 12 of the coupling tapered from a low point at the center of the coupling out through a high point and to another low point at the end of the coupling 10, the coupling would have to be formed in two halves and fitted over the ends of the pipe and then clamped together by some type of clamping means. The necessity for such clamping means is avoided by the present invention.

Figure 6:
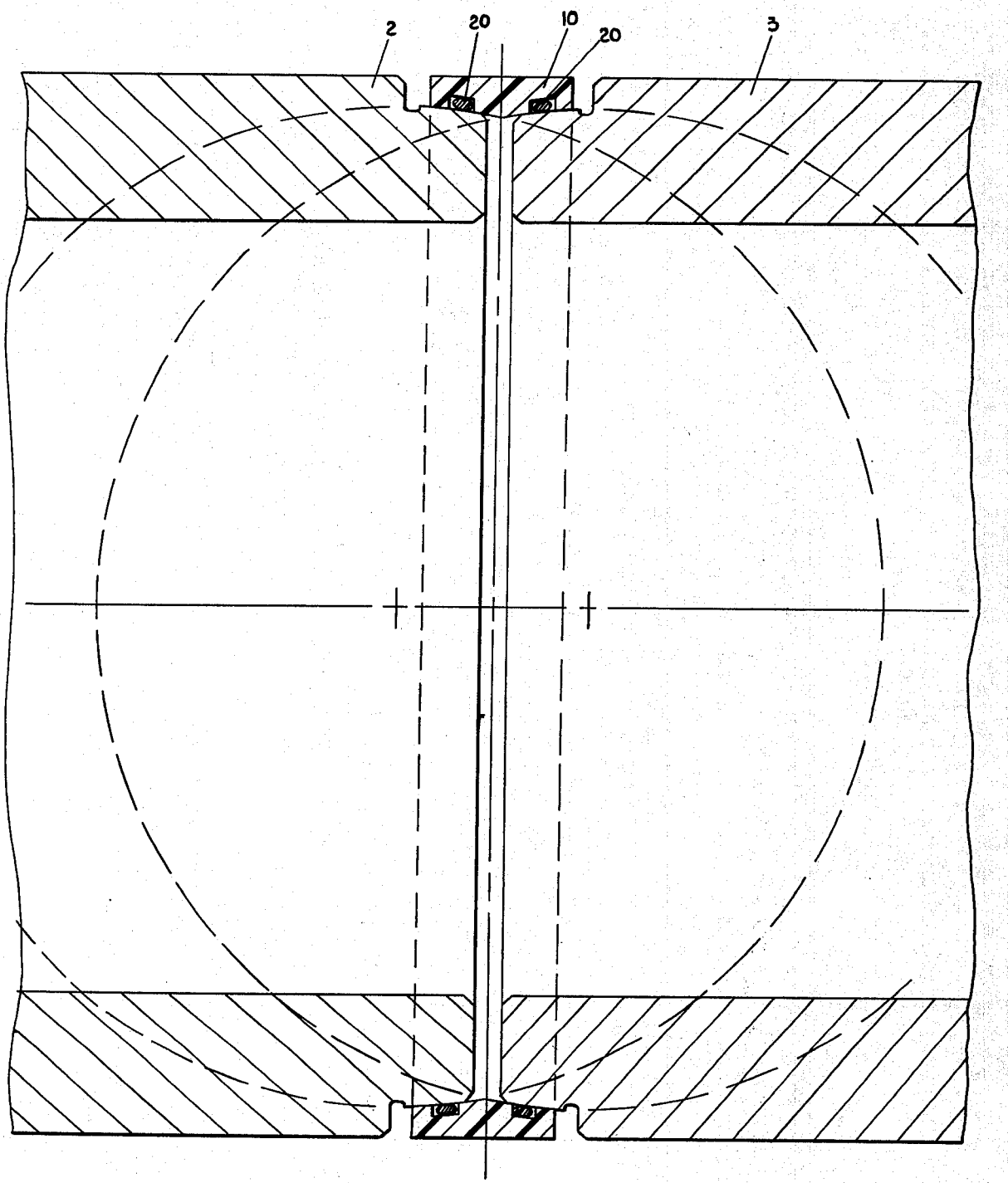
FIG. 6 is a longitudinal cross section view of the pipe joint with the pipe section coupled.

When a pipe section, such as pipe section 2 in FIG. 4 is being slidably joined with coupler 10 to form joint 1, the concentric arcs formed by the spherical taper surface 4 of the end of pipe section 2 and the corresponding spherical taper surface 12 are moved into overlapping or converging position as shown in FIG. 6.

It can be seen in FIG. 4 that until the concentric arcs formed by taper surface 4 of the end of pipe section 2 and the corresponding tapered surface 12 of the coupler 10 are overlapped, the end of pipe section 2 does not become engaged with the coupler 10 nor do the ends contact the O-ring seals 20 contained in channels 11 of coupler 10. As seen in FIGS. 9 and 10, when non-spherically tapered pipe sections 54 and 55 are adjoined into the pipe joint of FIG. 9, the male protruding end of pipe section 55 may become engaged with annular seal 56 and may actually disengage the seal 56 from channel 57 as shown in FIG. 10.

By use of mating spherical taper surfaces 4 and 12 of pipe sections 2 and 3 and coupler 10, the protruding ends of pipe sections 2 and 3 do not become engaged with seals 20 until the spherical taper surfaces 4 and 12 are mated. Thus, there is less danger of disengagement of seal 20 such as occurs in the prior art structure of FIG. 10.

Figure 5:
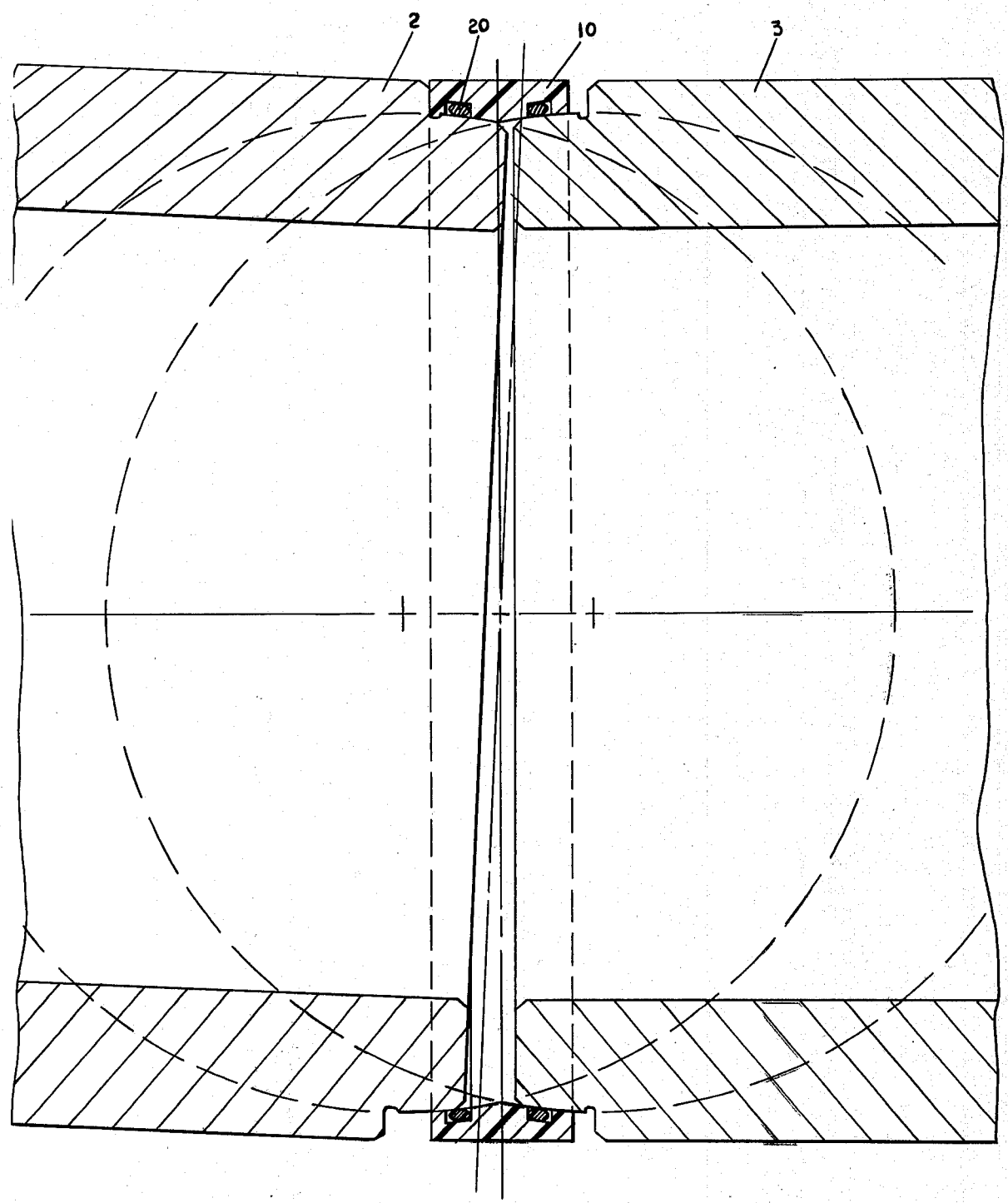
FIG. 5 is a longitudinal cross section view of the coupler and pipe sections with one pipe section being inserted into the coupler on an angle.

The mating spherical tapered surfaces 4 and 12 of pipe sections 2 and 3 and coupler 10 respectively also facilitate insertion of one pipe end into the coupler at an angle with respect to the longitudinal axis of the pipe which is already in place (see FIG. 5). With prior art pipes, one must be very careful to insure that one pipe end is inserted as straight into the other pipe end as possible so as to avoid problems such as rolling an annular seal out of position in the manner illustrated in FIG. 10, for example. The spherically tapered surfaces of the pipe ends and coupler of the present invention give a little more leeway in allowing one to insert a pipe at an angle with respect to the longitudinal axis of the pipe already in position. In FIG. 5, for example, the pipe 2 is inserted at an angle with respect to the pipe 3 such that the top portion of the end of pipe 2 becomes seated first. In FIG. 5, the bottom end of pipe 2 is not quite seated yet. By simply rotating pipe 2 downwardly slightly, both the top and bottom portions of the end of pipe 2 become properly seated in the manner shown in FIG. 6.

Figure 7:
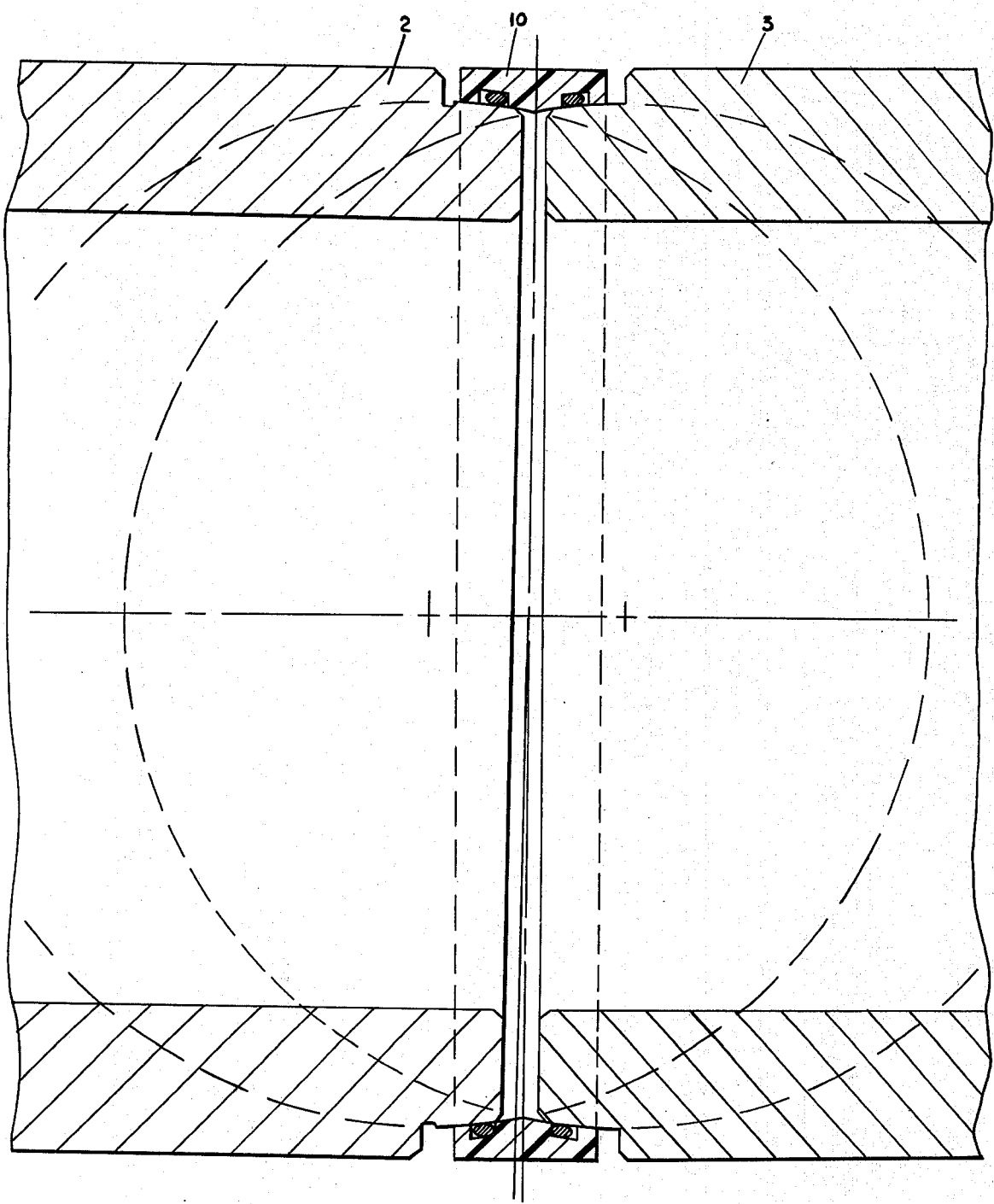
FIG. 7 is a longitudinal cross section view of the pipe joint with one pipe section slightly askew therein.
Figure 7A:
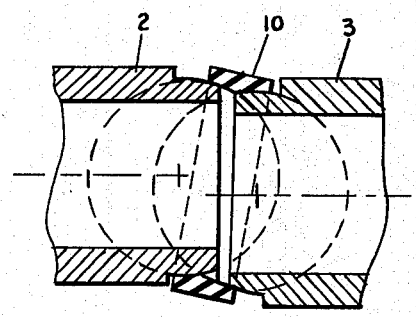
FIG. 7a shows joined pipes misaligned, but parallel.

Once pipe sections 2 and 3 and coupler 10 are joined so that the arcs defined by the spherical taper surfaces 4 and corresponding spherical taper surfaces 12 converge, pipe section 2 may become askewed slightly with respect to coupler 10 as shown in FIG. 7 without divergence of the concentric arcs formed by the shperical taper surfaces 4 and corresponding spherical taper surfaces 12 and without disengaging seals 20. Such skewing sometimes occurs as the ground shifts around the pipe after installation. The present invention allows such slight skewing without disruption of the seal. Since the arcs formed by these surfaces do not diverge, the mated surfaces 4 and 12 which define these arcs continue to be mated despite the skewing of pipe section 2 with respect to coupler 10 and the seal formed in pipe joint 1 is not disrupted. Pipe section 2 may be similarly skewed downwardly with respect to coupler 10 and/or laterally since the spherically tapered surfaces extend annularly around the pipe section and the coupler. Similarly, pipe section 3 could be rotated within coupler 10 without disrupting the seal forming pipe joint 1. FIG. 7a shows the manner in which the coupler 10 will rotate relative to both pipes to facilitate even parallel misalignment without disrupting the seals. Both pipe sections could skew and eventually lock up against the opposite ends of coupler 10. Coupler 10 will be in compression, and thereby have less tendency to break than the ends of conventional pipe when they skew.

Figure 11:
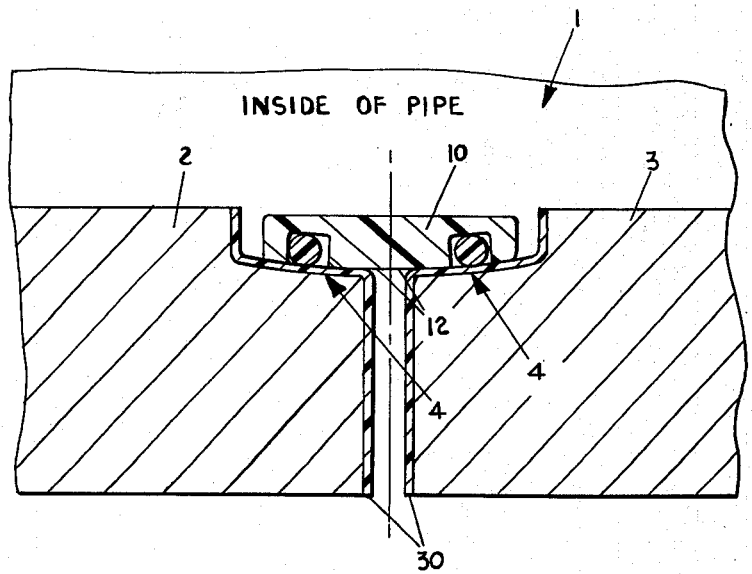
FIG. 11 is a partial longitudinal cross section view of a pipe joint wherein the pipe ends are capped with a plastic material and wherein the coupler is positioned inside the pipes.
Figure 12:
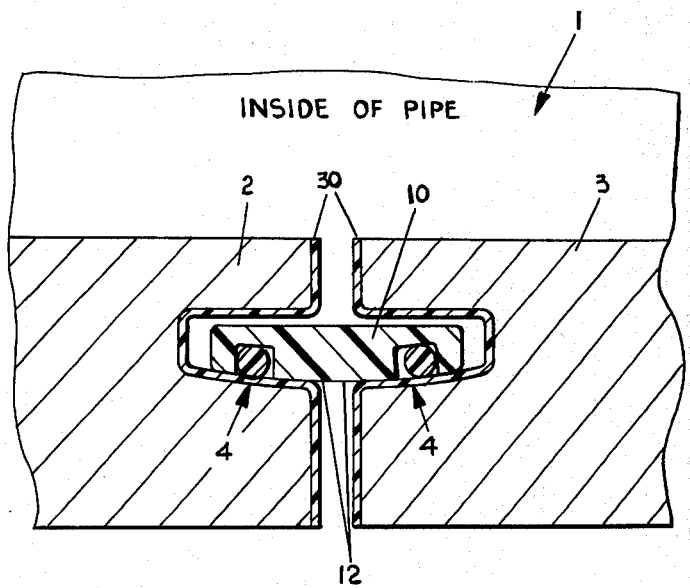
FIG. 12 is a partial vertical cross section view of an alternate embodiment of a pipe joint utilizing plastic caps over the ends of its pipe sections and utilizing a coupler positioned within recesses in the ends of the pipe walls.

In the embodiments shown in FIGS. 11 and 12, the protruding ends of pipe sections 2 and 3, including spherical taper surfaces 4, are covered with an end cap or ring 30. This may be molded of any material which facilitates slidable joining of pipe sections 2 and 3 with coupler 10 into the pipe joint 1. Among particularly useful materials are self-lubricating plastics, e.g., nylon, and Teflon-type materials. End caps or rings 30 may be self-adhering to the pipe sections, adhered during casting of the pipe, or may be attached by adhesive, etc.

The embodiment of the pipe joint shown in FIG. 11 is essentially that described in FIGS. 1–7 except that the spherically tapered surfaces 4 on the ends of pipes 2 and 3 face inwardly towards the center of the pipe rather than outwardly and the spherically tapered surfaces 12 on coupling 10 face outwardly rather than inwardly. As a result, the spherically tapered surfaces 4 are tapered concavely when viewed in longitudinal cross section from a high point spaced away from the center line of the pipe at the end of the pipe to a low point spaced farther towards the center line of the pipe at a point spaced from the end of the pipe. Conversely, the spherically tapered surfaces 12 of coupling 10 are tapered concavely from a high point at the center of coupling 10 towards low points at the end of the coupling 10. Thus, the respective concavities and convexities of the mating spherically tapered surfaces are reversed. In operation, the coupling 10 of FIG. 11 would be disposed on the inside surfaces of the pipes 2 and 3 where the coupling 10 of FIGS. 1–7 is disposed on the outside of the pipes 2 and 3.

The embodiment shown in FIG. 12 shows a joint 1 formed by seating coupler 10 in a seating channel 40 formed in the ends of pipe sections 2 and 3 and extending annularly therearound. The spherical mating taper surfaces formed in the embodiment shown in FIG. 12 are similar to those formed in FIG. 11. The spherically tapered surfaces 4 of pipe sections 2 and 3 of FIG. 12 face inwardly towards the center of the pipe, as do the spherially tapered surfaces 4 of the pipes 2 and 3 shown in FIG. 11. Thus, they must be concave and must extend from a high point at the end of the pipe to a low point at a point spaced from the ends of the pipes. Conversely, the sphericaly tapered surfaces 12 of coupling 10 are concave, extending from a high point at the center of coupling 10 to a low point at the end of coupling 10.

As is apparent from these figures, there are a multiplicity of joint-forming configurations utilizing mated spherical surfaces and caps as above-described. These will include couplers interior to the pipe sections, exterior to the pipe sections, and internal to the pipe sections wherein the spherical taper mating surfaces are either inwardly directed with respect to the pipe joint or outwardly directed.

It will be appreciated that in the borader aspects of the invention, coupling 10 can be construed to be a part of one of the two pipe sections and can in fact physically be part of one of the two pipe sections. That would be true in any of the three embodiments disclosed herein.

It will be understood that various other changes in the details, material, steps, and arrangements of parts which have been herein described and illustrated in order to explain the nature of the invention, may be made by those skilled in the art within the principle and the scope of the invention as expressed in the appended claims.

The embodiments of the invention in which an exclusive property or privilege is claimed are defined as follows:

1. A pipe joint for joining adjacent sections of sewer pipes, water pipe or the like, said joint comprising:

first and second pipe sections having cylindrical walls and end portions of lesser wall thickness than said cylindrical walls;

a first spherically tapered surface at one end of said first pipe section extending therearound and having an extremity beyond which it extends no farther;

a coupling collar for receiving said ends of said first and second pipe sections, said coupling collar having a wall thickness which is less than the wall thickness of said cylindrical walls of said pipe section and which, when combined with the wall thickness of said end portions of said pipe sections gives a combined thickness comparable to the thickness of said cylindrical walls, thereby eliminating protrusions from the inner and outer surfaces of said pipe sections; said coupling collar defining a second spherically tapered surface facing said first pipe section extending annularly therearound and having an extremity beyond which it extends no farther; said coupling collar defining a third spherically tapered surface generally adjacent said second spherically tapered surface and facing said second pipe section, said third spherically tapered surface extending annularly around said coupling collar and having an extremity beyond which it extends no farther; said second pipe section having a fourth spherically tapered surface at one end thereof extending annularly therearound and having an extremity beyond which it extends no farther, said third and fourth spherically tapered surfaces having mating configurations whereby said coupling collar can be joined to said second pipe section by matingly engaging said third and fourth spherically tapered surfaces; said first and second spherically tapered surfaces having mating configurations whereby said first pipe section and said coupling collar can be joined together by matingly engaging said first and second sphericaly tapered surfaces;

one of said first and second spherically tapered surfaces facing outwardly with respect to the center line of said first pipe section and the other of said spherically tapered surfaces facing inwardly with respect to the center line of said first pipe section to facilitate said mating engagement with one another;

said outwardly facing spherically tapered surface facing convexly outwardly, when viewed in longitudinal cross section, and tapering continuously from a point nearer its pipe section center line at said extremity to a point farther from said pipe center line and spaced along its length a distance away from said extremity;

said inwardly facing spherically tapered surface having an inwardly facing concave configuration when viewed in longitudinal cross section and tapering continuously from a point farther from said pipe center line at its said extremity to a point nearer the pipe center line at a point spaced along its length a distance away from its said extremity whereby said first pipe section and said coupling collar form a ball and socket coupling when joined together without the need for any special clamps for creating the joint; one of said third and fourth spherically tapered surfaces facing outwardly with respect to the center line of said second pipe section and the other of said spherically tapered surfaces facing inwardly with respect to a center line of said second pipe section to facilitate said mating engagement with one another; said outwardly facing spherically tapered surface facing convexly outwardly, when viewed in longitudinal cross section, and tapering continuously from a point nearer said pipe section center line at said extremity to a point farther from said pipe center line and spaced along its length a distance away from said extremity; said inwardly facing spherically tapered surface having an inwardly facing concave configuration when viewed in longitudinal cross section and tapering continuously from a point farther from said pipe center line at its said extremity to a point nearer said pipe center line spaced along its length a distance away from its said extremity whereby said coupling collar and said second pipe section form a ball and socket coupling when joined together without the need for any special clamps for creating the joint and whereby the same degree of annular skew can be achieved between said first and second pipe sections as would be achieved by a single ball and socket joint directly between said pipe sections, but with a lesser degree of taper in the matingly engaging surfaces of said pipes and said collar than would be required for a direct connection between said first and second pipe sections.

2. The pipe joint of claim 1 wherein said first and second, and said third and fourth, spherically tapered mating surfaces comprise therebetween an annular sealing means for sealing the pipe joint against leaking.

3. The pipe joint of claim 2 wherein said annular sealing means is housed in an annular channel in one of said spherically tapered surfaces, said channel sufficiently containing said annular sealing means so that sealing means only engages the other of said spherically tapered surfaces when said pipe sections are substantially joined together.

4. The pipe joint of claim 1 in which said second and third spherically tapered surfaces are located on the inside of said coupling collar and comprise said inwardly facing concave surfaces; said first and fourth spherically tapered surfaces on said first and second pipe sections respectively are located on the outside of said first and second pipe sections and comprise said outwardly facing convex spherically tapered surfaces.

5. The pipe joint of claim 1 in which said second and third spherically tapered surfaces on said coupling collar are located on the outside of said coupling collar and comprise said outwardly facing convex spherically tapered surfaces; said first and fourth spherically tapered surfaces on said first and second pipe sections respectively being positioned on the inside of said pipe sections and comprising said inwardly facing concave spherically tapered surfaces.

6. The pipe joint of claim 1 in which each of said first and second pipe sections includes an annular channel in the end thereof opening outwardly towards the other of said pipe sections when said pipe sections are aligned in end to end fashion; each of said annular channels comprising spaced side walls and a base wall; one of said side walls of said channel in the first pipe section being spherically tapered and comprising said first spherically tapered surface; one of said side walls in said channel in said second pipe section being spherically tapered and comprising said fourth spherically tapered surface.

7. The pipe joint of claim 6 in which the inwardly facing one of the spaced side walls of each of said channels in said first and second pipe sections respectively comprises said spherically tapered surface and comprises said inwardly facing concave spherically tapered surfaces; said spherically tapered surfaces on said coupling collar comprising outwardly facing convex spherically tapered surfaces.

8. The pipe joint of claim 1 in which said coupling collar is made of a plastic material.

9. The pipe joint of claim 8 in which each end of each of said first and second pipe sections is covered by a cap made of a self-lubricating plastic material whereby engagement of the ends of said first and second pipe sections with said coupling collar is facilitated.

10. The pipe joint of claim 1 in which said coupling collar is made of plastic; said first pipe section end being covered with a cap made of a self-lubricating plastic material whereby mating engagement of said first pipe section with said coupling means at said end of said second pipe section is facilitated.

11. The pipe joint of claim 1 in which said first pipe section includes an annular channel in the end thereof opening outwardly towards said second pipe section when said first and second pipe sections are aligned in end to end relationship; said channel including spaced sidewalls and a base wall; one of said spaced sidewalls of said channel being spherically tapered and comprising said first spherically tapered surface.

* * * * *

UNITED STATES PATENT AND TRADEMARK OFFICE
CERTIFICATE OF CORRECTION

PATENT NO. : 3,993,332
DATED : November 23, 1976
INVENTOR(S) : Daniel J. Borodin and Wilbur E. Tolliver It is certified that error appears in the above-identified patent and that said Letters Patent are hereby corrected as shown below:

Column 2, line 62:

After "important" delete the word ---most---;

Column 3, line 56:

"of" (1st occurence) should be ---on---;

Column 4, line 4:

"shperical" should be ---spherical---;

Column 5, line 2:

"sphericaly" should be ---spherically---;

Column 5, line 36:

After "extending" insert ---annularly---;

Column 5, lines 41 & 42:

"section" should be ---sections---.

Signed and Sealed this

Twenty-fourth Day of May 1977

[SEAL]

Attest:

RUTH C. MASON
*Attesting Officer*

C. MARSHALL DANN
*Commissioner of Patents and Trademarks*